US011936638B2

(12) United States Patent
Oberoi et al.

(10) Patent No.: US 11,936,638 B2
(45) Date of Patent: Mar. 19, 2024

(54) LINK PROTOCOL AGENTS FOR INTER-APPLICATION COMMUNICATIONS

(71) Applicant: Salesforce, Inc., San Francisco, CA (US)

(72) Inventors: Ankur Oberoi, San Francisco, CA (US); Abhishek Mahanti, San Francisco, CA (US); Helen Wei Zeng, San Francisco, CA (US); Serguei Mourachov, Vancouver (CA); Chirag Gupta, San Ramon, CA (US); Saurabh Sahni, San Francisco, CA (US)

(73) Assignee: Salesforce Inc., San Francisco, CA (US)

( * ) Notice: Subject to any disclaimer, the term of this patent is extended or adjusted under 35 U.S.C. 154(b) by 194 days.

(21) Appl. No.: 16/914,435

(22) Filed: Jun. 28, 2020

(65) Prior Publication Data
US 2020/0412708 A1 Dec. 31, 2020

Related U.S. Application Data

(60) Provisional application No. 62/868,419, filed on Jun. 28, 2019.

(51) Int. Cl.
*H04L 29/06* (2006.01)
*H04L 9/40* (2022.01)
(Continued)

(52) U.S. Cl.
CPC .......... *H04L 63/0807* (2013.01); *H04L 12/06* (2013.01); *H04L 63/02* (2013.01); *H04L 63/10* (2013.01); *H04L 67/02* (2013.01)

(58) Field of Classification Search
CPC ... H04L 63/0807; H04L 63/02; H04L 63/029; H04L 67/141
(Continued)

(56) References Cited

U.S. PATENT DOCUMENTS 5,983,265 A * 11/1999 Martino, II ............. H04L 69/18
709/206
6,161,123 A * 12/2000 Renouard ............. H04L 69/164
709/203
(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Saleh Najjar
*Assistant Examiner* — Peiliang Pan
(74) *Attorney, Agent, or Firm* — Holland & Hart LLP

(57) ABSTRACT

Methods, media, and systems for facilitating inter-application communications between a web platform and a remote application computing device are disclosed such that a link protocol agent associated with the web platform processes an authentication request based on which a temporary connection resource locator is provided. A connection is then established at the resource locator and maintained for a period of time. Payloads and acknowledgements are exchanged in the established connection. The connection is capable of being established across a firewall.

20 Claims, 9 Drawing Sheets

(51) Int. Cl.
*H04L 12/06* (2006.01)
*H04L 67/02* (2022.01)

(58) Field of Classification Search
USPC .......................................................... 726/9
See application file for complete search history.

(56) References Cited

U.S. PATENT DOCUMENTS

| | | | | |
|---|---|---|---|---|
| 7,334,126 | B1* | 2/2008 | Gilmore | H04L 63/0281 |
| | | | | 713/168 |
| 7,730,196 | B2* | 6/2010 | Hill | H04L 47/25 |
| | | | | 709/228 |
| 8,180,339 | B2* | 5/2012 | Douglas | H04L 43/08 |
| | | | | 455/418 |
| 8,300,663 | B2* | 10/2012 | Chion | H04L 1/1829 |
| | | | | 370/474 |
| 8,626,849 | B2* | 1/2014 | Yin | H04L 69/28 |
| | | | | 709/204 |
| 9,756,668 | B2* | 9/2017 | Farrell | H04W 4/027 |
| 10,212,165 | B1* | 2/2019 | Petersen | H04L 63/101 |
| 10,467,615 | B1* | 11/2019 | Omojola | G06Q 20/02 |
| 10,469,919 | B2* | 11/2019 | Yang | H04N 21/236 |
| 10,491,631 | B1* | 11/2019 | McCown | H04L 63/0428 |
| 10,608,936 | B1* | 3/2020 | Lesner | H04L 61/2092 |
| 10,749,985 | B2* | 8/2020 | Kapila | H04L 67/141 |
| 11,128,624 | B2* | 9/2021 | Wijaya | G06F 21/45 |
| 2011/0030043 | A1* | 2/2011 | Jones | H04L 63/0815 |
| | | | | 726/7 |
| 2014/0067687 | A1* | 3/2014 | Gadotti | H04W 12/126 |
| | | | | 705/64 |
| 2018/0077242 | A1* | 3/2018 | Carl | H04L 67/51 |
| 2018/0176203 | A1* | 6/2018 | Wang | H04L 67/141 |
| 2018/0287982 | A1 | 10/2018 | Draeger et al. | |
| 2018/0314603 | A1* | 11/2018 | Gibbons, Jr. | G06F 16/27 |
| 2019/0173989 | A1* | 6/2019 | Elmasri | H04M 1/2757 |
| 2019/0295054 | A1* | 9/2019 | Purves | G06Q 20/36 |
| 2019/0340259 | A1* | 11/2019 | Pavitt | G06F 16/958 |
| 2020/0053419 | A1* | 2/2020 | Van Deventer | H04N 21/4383 |
| 2020/0067903 | A1* | 2/2020 | Yegorin | H04L 67/562 |
| 2020/0077159 | A1* | 3/2020 | Deshpande | H04N 21/84 |
| 2020/0084253 | A1* | 3/2020 | Ljung | H04L 65/65 |
| 2020/0220853 | A1* | 7/2020 | Xu | G06F 16/955 |
| 2020/0267201 | A1* | 8/2020 | Rauschenbach | G06F 9/542 |
| 2020/0267422 | A1* | 8/2020 | Van Brandenburg | |
| | | | | H04N 21/64322 |
| 2020/0351260 | A1* | 11/2020 | White | G06F 21/445 |
| 2020/0389543 | A1* | 12/2020 | Swope | H04L 67/34 |
| 2020/0402049 | A1* | 12/2020 | Pi Farias | G06Q 20/208 |
| 2020/0403994 | A1* | 12/2020 | Bitterfeld | H04L 63/083 |
| 2020/0412708 | A1* | 12/2020 | Oberoi | H04L 63/029 |
| 2021/0306318 | A1* | 9/2021 | Yokoyama | H04L 67/02 |
| 2021/0400037 | A1* | 12/2021 | Montgomerie | H04L 63/083 |
| 2022/0103525 | A1* | 3/2022 | Shribman | G06F 16/955 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https:/mastersofscale.com/#/stewart-butterfield-the-big-pivot/, (dated Jan. 17, 2018) 27 pages.

* cited by examiner

| Slash command | Action |
|---|---|
| /apps* | Search for Slack apps in the App Directory |
| /archive | Archive the current channel |
| /away* | Toggle your "away" status |
| /collapse | Collapse all inline images and video in the current channel (opposite of /expand) |
| /dnd [some description of time] | Start or end a Do Not Disturb session |
| /expand | Expand all inline images and video in the current channel (opposite of /collapse) |
| /feed help [or subscribe, list, remove] | Manage RSS subscriptions |
| /search engine [on/off] | enables emailed search in system |
| /invite @someone [#channel] | Invite a member to a channel |
| /join [#channel] | Open a channel and become a member |
| /leave (or /close or /part) | Leave a channel |
| /me [your text] | Display italicized text, e.g./me does a dance will display as *does a dance*. |

FIG. 7

LINK PROTOCOL AGENTS FOR INTER-APPLICATION COMMUNICATIONS

RELATED APPLICATIONS

This non-provisional patent application claims priority benefit, with regard to all common subject matter, of earlier-filed U.S. Provisional Patent Application No. 62/868,419 filed Jun. 28, 2019 and entitled LINK PROTOCOL AGENTS FOR CROSS-FIREWALL COMMUNICATIONS. The identified earlier-filed provisional patent application is hereby incorporated by reference in its entirety into the present application.

TECHNICAL FIELD

Typically building an application that takes advantage of interactive features of a web platform requires the application to expose a HTTP/HTTPS endpoint on the public Internet to the web platform. Without being able to receive events from the web platform, a developer cannot meaningfully build an interactive application. Unfortunately, many web platform administrators do not allow developers to create these publicly available endpoints, and that results in a very high sometimes insurmountable barrier in getting those developers to create applications and unlock platform capabilities. This is to say that developing an application that receives asynchronous messages or events from a third-party system typically requires the application to poll a service associated with the third-party system or to set up infrastructure that will provide an endpoint to which the third-party system can connect to provide the messages or events. If the third-party system is external to an enterprise that is developing the application, the application endpoint will have to have a public IP address and significant infrastructure overhead in terms of network configuration and possibly a reverse proxy server, etc. Moreover, interfacing systems through a network or host-based firewall involves integration of distributed computing resources, where at least one of the distributed computing resources is protected by a firewall. Firewalls are network security tools that control transmission of data to and/or from a protected computing resource. However, stringent security rules associated with firewalls can complicate or even prevent integration of distributed computing resources (i.e., access to computing resources by remote computing devices). Such complications undermine efficiency and reliability of the firewall-protected computing resources and other computing resources attempting to access the firewall protected computing resources. As a result of the firewall and associated rules, scalability, performance, and reliability are impacted in systems for which cross-resource integration through a firewall is required.

Some existing firewalls have rules that limit privileged communications between a protected device and devices associated with a number of statically defined Internet Protocol (IP) addresses. Other firewalls have rules that require computationally expensive handshake procedures. Accordingly, complying with firewall security rules render the integration costly and un-scalable, i.e. if static IP address tables must be maintained. Moreover, complying with the noted firewall security rules upon each attempted communication with the firewall-protected computing resource can substantially reduce effectiveness and efficiency of distributed integration. In order to facilitate a particular integration, certain security features of the firewall may be disabled or turned off. This ease of integration versus security trade-off presents a false choice between firewall security on the one hand and efficiency and reliability of data integration on the other, such that more secure resources are deemed less easily integrated and vice versa. Accordingly, there is a need for a secure solution that is susceptible to easy and scalable integration to avoid having to provide network and server infrastructure for a web-hook type endpoint and to connect through any network firewalls.

Further challenges are based on the fact that enterprises frequently have strict policies around enabling tunnels or proxies to get through firewalls. These tunnels and proxies usually need to be vetted by an enterprise's internal network and security teams. The interested application developer may not be able to get approval or even know how to enable these capabilities, as web platform application developers typically do not have an infrastructure background. Sometimes these barriers make it difficult to even build a proof of concept.

SUMMARY

In general, embodiments of the present disclosure provide methods, apparatus, systems, computing devices, and/or the like for inter-application communication using link protocol agents associated with the web platform. The agents receive, at the link protocol agent, an authentication request from the application, and then determine that the authentication request is successful. If successful, the agents provide a temporary connection resource locator and a connection token to the application and receive, at the link protocol agent, a connection request from the application. In response to receiving the link protocol connection request the agents establish a link protocol communication connection in response to the link protocol connection request by validating the connection token and maintain the link protocol communication connection for a connection maintenance time interval associated with the connection request. The agents transmit at least one link protocol communication payload based on state associated with the web platform and receive an acknowledgement from the application acknowledging receipt of the payload.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 5A:
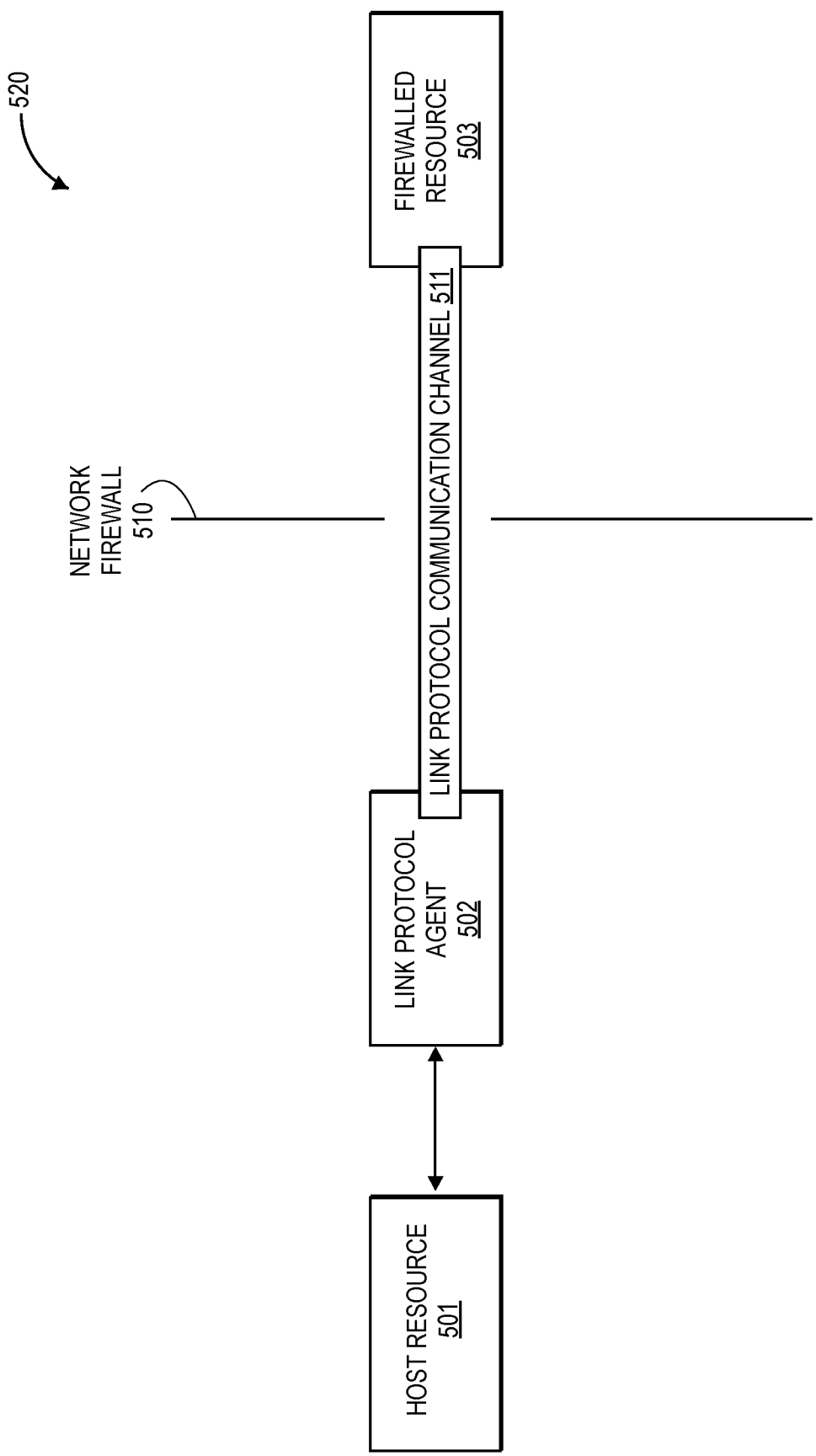
Figure 5B:
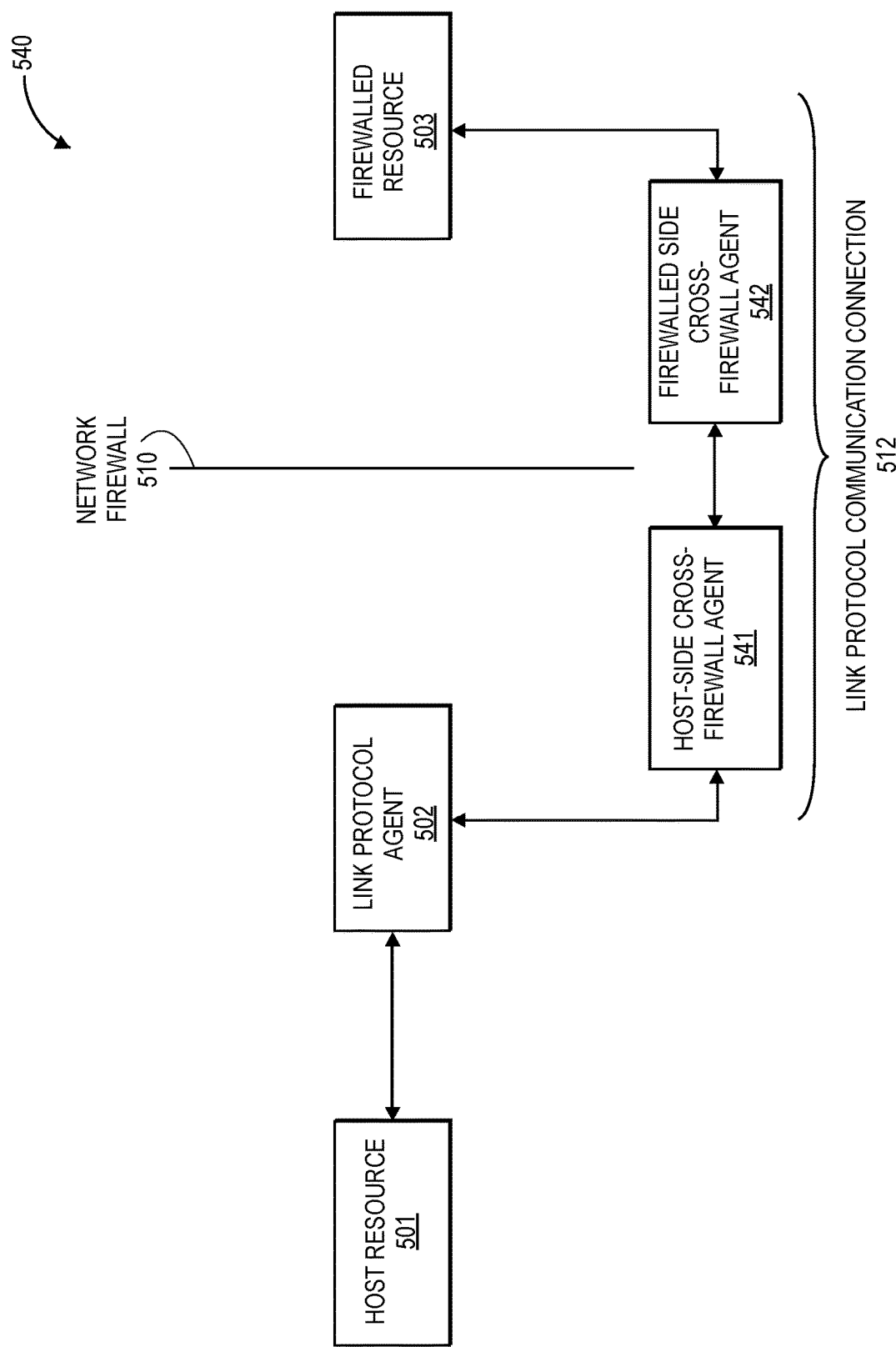
Figure 5C:
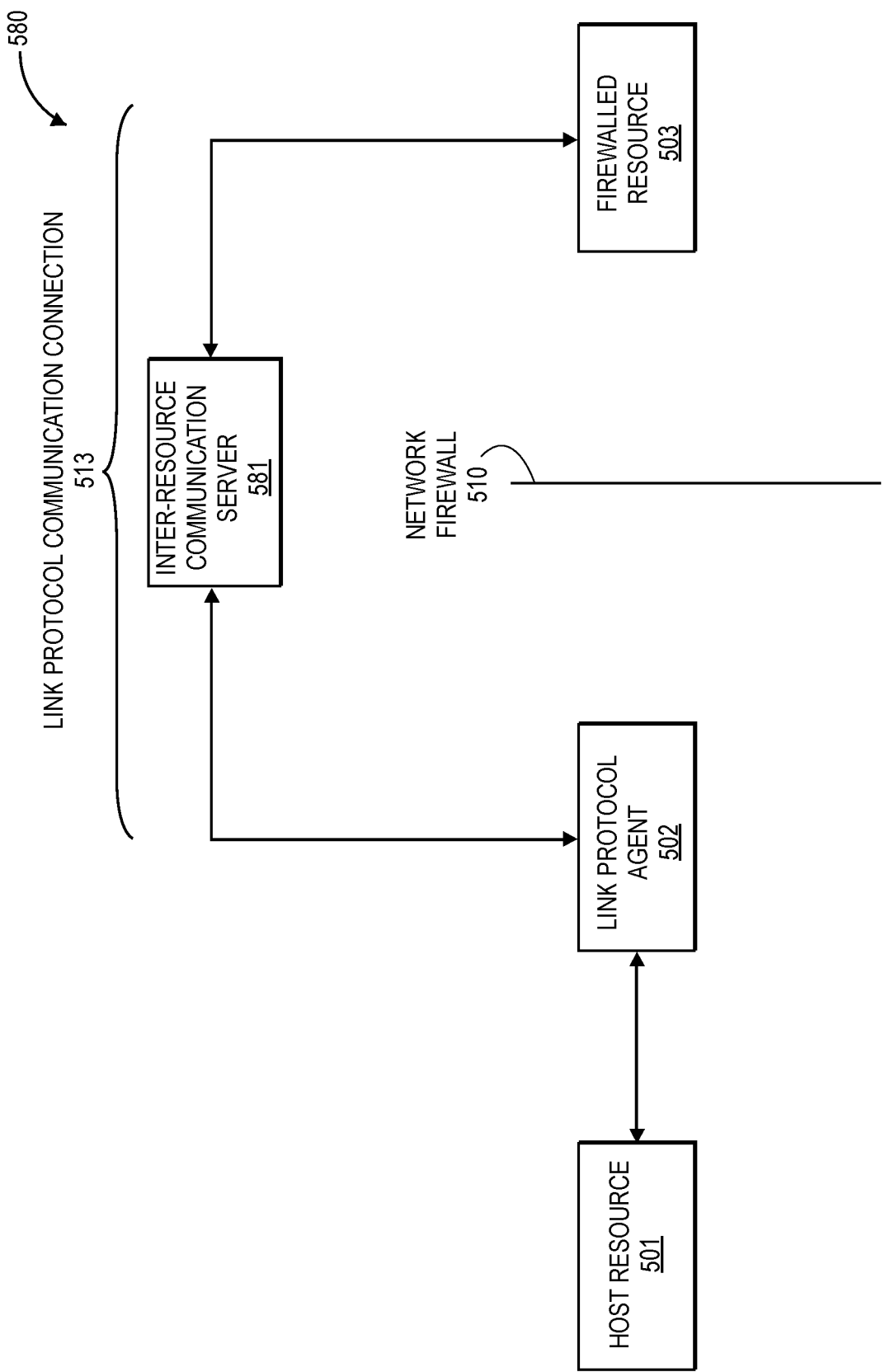
Figure 6:
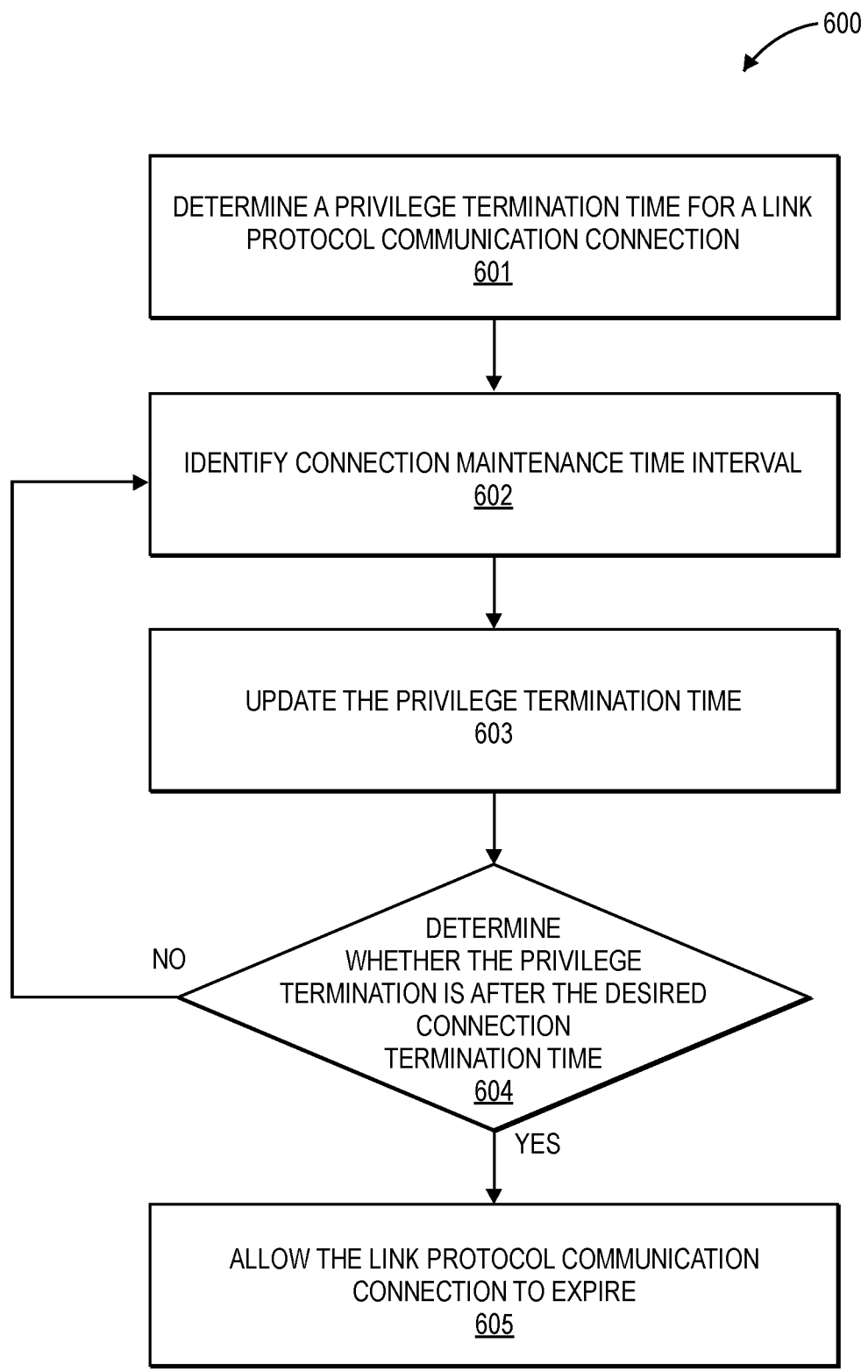

FIGS. 5A-C each depict a data flow diagram of an example process for creating a link protocol communication connection in accordance with one embodiment of the present disclosure;

FIG. 6 is a flow diagram of an example process for maintaining a link protocol communication connection in accordance with one embodiment of the present disclosure; and FIG. 7 is an operational example of various slash commands in accordance with one embodiment of the present disclosure.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

As used herein, the term "or" is meant in both the alternative and conjunctive sense, unless otherwise indicated. As used herein, the terms "illustrative," "example," and "exemplary" are used to refer to examples with no indication of quality level. As used herein, the term "comprising" means "including but not limited to," and should be interpreted in the manner it is typically used in the patent context. Use of broader terms such as comprises, includes, and having should be understood as broader than and distinct from narrower terms such as consisting of, consisting essentially of, and comprised substantially of.

The phrases "in one embodiment," "according to one embodiment," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements.

The present teachings describe a link protocol feature that has two primary motivations: (i) to enable web platform applications to interface securely with internal systems behind a firewall, a common practice for our security-conscious large enterprise users; and (ii) to allow apps to run without exposing public endpoints, greatly reducing security risks and administrative overhead for all users, including large enterprise users.

To enable successful application development behind a firewall, an implementation is provided consisting of two parts: a link service and features within an application configurator to support the link protocol. Both the link service and the application configurator implement the link protocol, allowing for the transmission of payloads over a link connection.

In the application configurator, an app-level toggle is provided that enables message delivery to an application over the link protocol rather than using HTTP endpoints. The link service manages link connections with the developer's application and interfaces with the application configurator. In some embodiments, the link service manages link connections between third-party applications and a channel-based messaging platform. In some embodiments, the link service manages link connections between third-party applications and a group-based communication system. In some embodiments, the web platform is a group-based communication system. In some embodiments, the group-based communication system is a channel-based messaging platform.

In various embodiments, link protocol messages are delivered to a third-party application in a similar way to how events and messages are delivered to a third-party application by way of HTTP endpoints. Using the Events API as an example, the flow looks like this:

1. A user of a group-based communication system performs an action (e.g. sends a message).
2. Events API determines a set of applications that are subscribed to the generated event.
3. Events API publishes the payload to a job queue.
4. The job queue sends an associated payload over the link protocol (and possibly retries) instead of connecting to a registered public endpoint associated with the application.
5. Retry is required when the application doesn't send an acknowledgement, and is attempted after 0, 1 and 5 minutes or a predetermined period of time.

For payloads that require a response (e.g. application interactivity messages), the application will respond with an ACK response that contains additional metadata that will then be processed by the group-based communication system and possibly presented to a user through a client user interface.

In various embodiments, payloads are sent as JSON objects, each event with its own canonical ID (e.g. event_id for Events API, trigger_id for slash commands). The object has two top-level attributes, metadata and payload. The payload can contain the contents that a developer would expect from a message delivered over HTTP. The metadata has link protocol specific data and is present in the JSON object.

```
{
    payload: <$payload_shape>,
    metadata: {
        id: <$unique_identifier_string>,
        type: <$type_enum>,
        accepts_rich_response: <$response_required_bool>
    }
}
```

If the message received by the app is from Events API, the link protocol agent will retry it at the same intervals as a developer expects if they are receiving over HTTP. Delivery of messages are handled by the job queue and transport layer is determined by the applications' preference. (Link vs HTTP) as specified in the application configurator, which is a store of metadata in the web platform for configuring aspects of the application. Link protocol event delivery is toggled by the developer within the app management page associated with the application configurator. When dispatching messages, this parameter is used to determine whether the application has elected to receive messages via link protocol or at a public HTTP endpoint.

Various embodiments relate to establishing and maintaining cross-firewall communication connections that are initiated and maintained by a resource that is located inside a firewall. In some embodiments, firewalled resources have the capability to communicate through an intermediate host computing entity which is itself authorized to communicate without firewall scrutiny. In other ways, firewalled resources may provide communication connections to host computing entities that are exempt from significant firewall processing beyond determining source of those communications. Various embodiments of the present disclosure relate to establishing and maintaining link protocol communication connections based on such cross-firewall communications. These link protocol communication connections provide yet another means for ensuring cross-firewall communications between a firewalled resource and another computing resource. By providing a low-cost and highly reliable way of ensuring cross-firewall communications between a firewalled resource and another computing resource, various embodiments of the present disclosure overcome technical problems related to efficiency, reliability, and security of distributed computer resources.

In various embodiments, these cross-firewall communication connections are established over existing network infrastructure that is already in place for accessing worldwide-web resources over the HTTP and HTTPS protocols, using existing proxy servers and well-known ports for those protocols (typically ports 80 and 443). In an embodiment, the connection is a Websocket Protocol connection based on the Websocket Protocol standard as set forth in Internet Engineering Task Force ("IETF") Request for Comments ("RFC 6455"). In an alternative embodiment, a universal remote procedure call framework such as gRPC is employed. In yet another alternative embodiment, HTTP polling or HTTP2 server push is employed. It is understood that any suitable network messaging framework or protocol can be employed such as MQTT.

The present teachings have the advantage of providing a reliable and scalable transport mechanism. Applications consistent with the present teachings are able to switch between providing an endpoint and the disclosed mechanism. In the case of a group-based communication system, mechanisms consistent with the present teachings are able to send events and/or messages for all installed workspaces to the application. The present teachings provide a mechanism that remains consistent with existing product/technical requirements for supported features such as: response options, retry mechanisms, and payload structure. The mechanism is secure and works in conjunction with other web platform security features. Further, client complexity is minimized because from the perspective of the client, inter-application communication the same regardless of the mechanism.

Applications that are built according to the present teachings are installable without the application needing to set up externally available URLs for the OAuth flow. In one embodiment, the application uses the web platform-hosted OAuth from the application settings for the workspace the application was created in. In an alternative embodiment, the developer sets up an OAuth redirect URL that's local/intranet available, and continues to use OAuth for installation across multiple workspaces.

Figure 1:
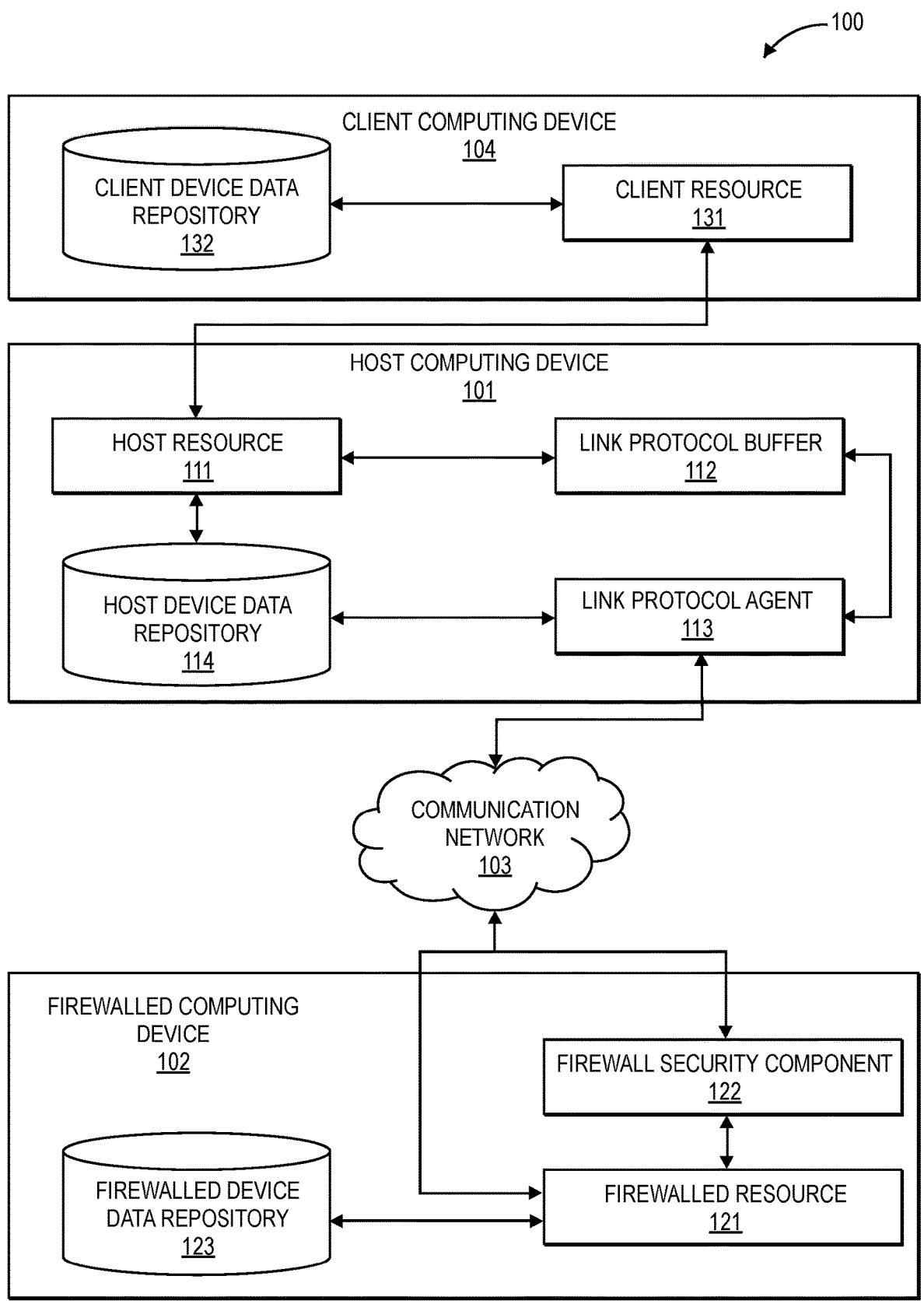
FIG. 1 depicts an exemplary hardware platform for certain embodiments of the invention.

FIG. 1 illustrates an example system architecture 100 within which embodiments of the present disclosure may operate in connection with a host-based firewall. The architecture 100 includes a host computing device 101 and a firewalled computing device 102 which are configured to communicate over a communication network 103. In various embodiments, the firewalled computing device 102 is an application server, such as an email server, a database server, or any other kind of application server that provides access to application data via an application programming interface. The communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include a cellular telephone, a 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of a group-based communication system embodied by the system architecture 100. In one embodiment, the protocol is a custom protocol of JSON objects sent via a Websocket connection. In one embodiment, the protocol is JSON over RPC, JSON over REST/HTTP, and the like. It is understood that REST/HTTP operates in connection with a web server listening on one or more TCP ports.

As used herein, the term "communication network" refers to hardware infrastructure and associated software instructions that allow two or more electronic devices (e.g., two or more computing devices) to communicate together. A communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a communication network may include a cellular telephone, an 902.11, 902.16, 902.20, and/or WiMax network. Further, the communication network may include a public network, such as the Internet, a private network, such as an intranet, or combinations thereof.

The host computing device 101 is configured to enable a host resource 111 (e.g., a software resource associated with a group-based communication server for a group-based communication system) to communicate with (e.g., transmit data to and/or receive data from) a firewalled resource 121 executing on the firewalled computing device 102 (e.g., a computing resource executing on a third party server, where the computing resource is configured to interact with and/or be integrated with a group-based communication system). To enable the host resource 111 to communicate with the firewalled resource 121, the host computing device 101 may be configured to interact with data transmission control mechanisms enforced by a firewall security component 122 of the firewalled computing device 102, such as data transmission control mechanisms maintained by the firewall security component 122 about which outgoing communications from the firewalled resource 121 are authorized to be successfully transmitted to their intended destinations and/or which incoming communications for the firewalled resource 121 are authorized to be successfully received by the firewalled resource 121. In various embodiments, the firewall security component 122 is a host-based firewall. A purpose of the firewall security component 122 may be to enhance security of data transmission between the firewalled resource 121 and other computing resources, such as the host resource 111 and/or the client resource 131.

The host computing device 101 may include, in addition to the host resource 111, a link protocol buffer 112, a link protocol agent 113, and a host device data repository 114. The link protocol buffer 112 may be configured to store intended transmission data that the host resource 111 intends to transmit to one or more external resources (e.g., to the firewalled resource 121). The link protocol buffer 112 may be further configured to provide such intended transmission data to the link protocol agent 113.

The link protocol agent 113 may be configured to perform cross-firewall communications between the host computing device 101 and one or more firewalled computing devices, such as the firewalled computing device 102. For example, the link protocol agent 113 may be configured to receive intended transmission data from the link protocol agent 113 and provide the intended transmission data to or more firewalled computing devices, such as the firewalled computing device 102. Some aspects of various operations of the link protocol agent 113 are described below with reference to FIGS. 4-7.

The host device data repository 114 may be configured to store data associated with one or more of the components of the host computing device 101. For example, the host device data repository 114 may be configured to store data associated with the host resource 111 (e.g., data associated with group-based communication channels, group-based communication interfaces, and the like for a host resource 111 associated with a group-based communication server for a group-based communication system), data associated with the link protocol buffer 112 (e.g., one or more buffering parameters, such as maximum buffering capacity, overflow policies, etc.), and data associated with the link protocol agent (e.g., one or more policies for creating and/or maintaining link protocol communication connections, information associated with existing link protocol communication connections, etc.). The host device data repository 114 be embodied as one or more data storage devices such as a Network Attached Storage (NAS) device or devices, or as a separate database server or servers.

The architecture 100 further includes a client computing device 104 configured to communicate with the host computing device 101, e.g., over a communication network (not shown). The client computing device 104 may be a computing device configured to enable one or more end-users to interact with one or more services provided by the host resource 111. For example, the client computing device 104 may enable an end user to utilize services of a group-based communication system and/or a group-based communication server associated with the host computing device 101, where the host resource 111 may be a server-side software resource associated with the group-based communication system. As used herein, the term "user" should be understood to refer to an individual, group of individuals, business, organization, and the like. The users referred to herein may access a communication system using client devices.

The communication network used to communicate between the client computing device 104 and the host computing device 101 may be communication network 103 or another communication network. The communication network used to communicate between the client computing device 104 and the host computing device 101 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network used to communicate between the client computing device 104 and the host computing device 101 may include a cellular telephone, a 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of a group-based communication system embodied by the system architecture 100. In one embodiment, the protocol is a custom protocol of JSON objects sent via a Websocket connection. In one embodiment, the protocol is JSON over RPC, JSON over REST/HTTP, and the like.

The client computing device 104 may include a client resource 131 and a client device data repository 132. The client resource 131 may be a collection of one or more software instructions configured to enable the client computing device 104 to communicate with the host computing device 101 and/or utilize one or more services provided by the host computing device 101. For example, the client resource 131 may be a client-side software resource associated with a group-based communication system.

The client device data repository 132 may store data utilized by the client resource 131. For example, if the client resource 131 is a client-side software resource associated with a group-based communication system, the client device data repository 132 may store data associated with the group-based communication system, such as one or more of user profile data associated with the group-based communication system, user authentication data associated with the group-based communication system, channel content data associated with the group-based communication system, configuration data associated with the group-based communication system, backup data associated with the group-based communication system, etc. The client device data repository 132 may be embodied as one or more data storage devices such as a Network Attached Storage (NAS) device or devices, or as a separate database server or servers.

In various embodiments, mechanisms are established for connection and authentication of the application to the web platform. The link protocol of the present teachings sends application activity across all workspace installations to the application's connection, rather than setting a connection for each installation. To do this, a specialized per-application authentication endpoint is provided that enables developers to make a call to an endpoint that gives them a temporarily connectable web socket URL.

To ensure that this service can be gracefully and regularly updated, client connections are regularly rotated by initiating a temporary disconnect. Developers need to enable the application to re-connect to continue receiving events.

The first step for authentication is to make an API call to the link.access endpoint as shown below in the sample request. In various embodiments, this is a HTTP(S) endpoint that is called by the developer. When it is called with the developer's client id and secret key (either in the HTTP POST body or associated HTTP headers), the API will issue a short-lived token that is cached for a limited time (e.g., 5 minutes). In various embodiments, this token is appended to the socket URL which is passed down to the developer in the returned data of the API call.

Each web socket URL can be called once for connection, at which point the cached ticket will be invalidated. In various embodiments a low rate limit tier is provided for this API, due to its infrequency for developers to call. This prevents resource overconsumption. If called too frequently, an error message will be returned.

In various embodiments, the developer can connect using the provided Websockets URL within 5 minutes. After that, the link expires and the developer needs to make a new call to link.access to obtain a new valid URL. In a scenario where the developer requests to connect, but has not enabled Link in the developer dashboard, a link_not_enabled warning along with their web socket URL is returned. In some embodiments, in lieu of a client identifier and a shared secret key, the client could initiate an OAuth2 handshake and obtain an associated token, which would be used to authenticate the actual connection as further described below.

In various embodiments, the second step is to connect to the web socket using the returned web socket URL from a successful call to link.access. The developer can directly initiate a web socket connection with that URL. To avoid resource consumption, in various embodiments, an application can have a maximum of 50 simultaneous connections. In various embodiments, the client presents an OAuth or similar authentication token at the time the connection is established. In various embodiments, upon connection, the link protocol agent 113 will return a hello message that includes an acknowledgement and debug info:

Web Socket Pings and Pongs (Non-JSON):

The web socket protocol defines control frames, including ping and pong. The link protocol agent 113 utilizes these frames as a means to verify that the link client is still responsive.

Disconnecting a Link Protocol Web Socket Connection

When a developer turns off the link protocol toggle in the application administrative web UI, the application configurator will store the state change in a database associated with the web platform and then terminate all open link protocol connections to the application.

Conversely, a developer may wish to stop receiving messages from a single connection, instead of turning off the entire feature's firehose. This can happen when the developer wishes to do a rolling deploy of their application or if they wish to stop receiving events for other maintenance.

To disconnect, the developer can simply close the web socket connection and link protocol will continue to deliver messages to the remaining connections if they exist.

In various embodiments, applications must have the capability of refreshing their link protocol connections. In various embodiments, this process works as follows. While web socket connections can be established and remain connected theoretically forever, in practice the backend servers of the web platform may need to disconnect, and therefore it is desirable to encourage developers to be resilient to these disconnects. Moreover, ongoing stale connections may result in overuse of resources.

To ensure that developers are able to disconnect regularly, and to allow for updates to infrastructure associated with the link service, the link service will initiate a disconnect approximately every five hours. If possible, the link service may issue a warning message to the developer. This will be followed by the actual disconnection event. In various embodiments, this event provides a reason as follows:

A refresh request is used to specify that the application can (and should) reconnect.

If the link service issues a warning, the application can optionally create a new connection immediately, as long as the threshold, for example, of 50 simultaneous connections is not exceeded to avoid resource overconsumption by a particular application.

Server Refresh Connection Warning Message:

In various embodiments, the link service rotates existing connections approximately every five hours. In various embodiments, approximately ten seconds before the disconnection happens, the link service may issue an optional warning that the connection is about to expire.

Payloads from Link Protocol

In various embodiments, payloads are delivered as JSON objects, each with a canonical ID (a generated UUID). The object has two top-level attributes: metadata and payload. payload contains the contents that a developer would expect from a message delivered over HTTP. The metadata has Link Protocol-specific data, including the event type, a canonical ID, retry attempt number and whether it requires a rich response.

An example payload structure follows:

```
{
    "payload": <$payload_shape>,
    "link_id": <$unique_identifier_string>,
    "type": <$event_type_enum>,
    "accepts_rich_response": <$accepts_rich_response_bool>
}
```

Feature specific sections below contain examples of Events API and Interactivity payloads sent from a group-based communication system.

Responding Back to Link Protocol

```
{
    "type": "response",
    "link_id": <$unique_identifier_string>,
    "payload": <$payload_shape> // optional
}
```

In various embodiments, the Events API sends messages to a developer's HTTP endpoint with workspace-level events, based on whichever mechanism that an application developer chooses. Link protocol dispatch occurs in connection with a job queue job that, by default, delivers events via HTTP. Depending on the applications current configuration, the event or message will be delivered to the endpoint or placed as a payload into the link protocol connection and attempt to deliver the payload to the developer's open web socket connection. If the application is offline or unavailable, the delivery will fail and the link service will update the state of delivery in metadata associated with the web platform.

Retry Logic

Since Events API message payloads do not require immediate action from an application to update an end users' client user interface, retries on the outgoing HTTP request occur after 3 seconds, 1 minute, 5 minutes, or a predetermined time period if not acknowledged.

In various embodiments, if an application doesn't reach a predetermined success rate, for example at least 5% of events per 60 minutes, of Events API activity, the web platform automatically disables the sending of Events API payloads.

To acknowledge receipt of an event, the developer's application provides a response with the identity of the original message so that retries are not carried out. In an embodiment, the Events API exhibits improved reliability of event delivery. One of the main challenges with the Events API is that it is impossible to guarantee that event delivery is successful, much less for a specified amount of time. In some embodiments, when an internal system fails, events during that time are lost. This potential problem is addressed by durably storing events somewhere until confirmation is received that the app has received the event. If this happens, this queue of events is allowed to fill up beyond the 6 minute time window or a predetermined time window for normal delivery retries. In various embodiments, the queue is shared between the link service and the Events API itself.

In various embodiments, application success metrics are computed in connection with utilization of the link protocol. These metrics include reliability and scalability metrics and track: connection uptimes, reconnect times, number of connections per tenant that can be supported, number of aggregate connections that can be supported.

The link protocol is logged in a granular way so that a number of active applications can be determined as well as their scope of use. If the web platform provider is providing a mechanism for on-premises applications to connect to a public endpoint, the public endpoint should be able to handle connections from rogue elements, and be robust in the face of denial of service attacks etc., which is accomplished in connection with endpoint security practices.

Events API Example

```
{
    "payload" : {
        "token": "bHKJ2n9AW6Ju3MjciOHfbA1b",
        "team_id": "T0SNL8S4S",
        "api_app_id": "A0ZUKV943",
        "event": {
            "client_msg_id": "2aa66e84-b058-489b-931b-fcc37a8f1d79",
            "type": "message",
            "text": "ping",
            "user": "U0SNL8SV8",
            "ts": "1583521829.000200",
            "team": "T0SNL8S4S",
            "blocks": [ [Object] ],
            "channel": "C15SASXJ6",
```

-continued

```
            "event_ts": "1583521829.000200",
            "channel_type": "channel"
        },
        "type": "event_callback",
        "event_id": "Ev1660RPAN",
        "event_time": 1583521829,
        "authed_users": [ "U0ZULBZJP", "U0SNL8SV8" ],
    },
    "link_id": "1000000000000001",
    "type": "events_api",
    "retry_attempt": 1,
    "retry_reason": "timeout", //"no_connection", "unknown"
    "accepts_rich_response": false
}
```

Response

```
{
    "type": "ack",
    "link_id": "1000000000000001"
}
```

This event may have a retry_attempt attribute in link_metadata that is included only when the message is an Events API retry. This pattern follows the regular implementation of Events API retries, which is generally one immediate retry, a second retry after about one minute, and a third retry after about five minutes.

App Interactivity messages include messages generated by slash commands, interactive modals and dynamic menus. Slash commands allow users to invoke a group-based communication system app by typing a string into the message composer box. A submitted slash command will cause a payload of data to be sent from the group-based communication system to the associated app. The app can then respond in whatever way it wants using the context provided by that payload. Unlike the Events API, the messages that are found in the interactive messages queue require a fast response (within 3 seconds) from a developer's backend. For this reason, in various embodiments, retries are not attempted.

In some embodiments, the first communication object is generated based on a user request by an end-user of a group-based communication system. Examples of such end-user requests include various slash commands in the group-based communication system, such as the slash commands depicted in the operational example 700 of FIG. 7. In some embodiments, to the extent a slash command requires communication with external resources (e.g., external software applications), the link protocol agent 113 may utilize a link protocol communication connection to transmit data to communicate with the noted external resources. In some of those embodiments, a group-based communication system server may utilize a link protocol agent which maintains indefinite communications with the external resources to communicate with external resources associated with software applications that are integrated in the group-based communication system environment. In some embodiments, a group-based communication system server may utilize a link protocol agent to communicate with external resources that have indicated a desire to enroll in and/or subscribe to a link protocol program associated with the link protocol agent. In various embodiments, these external resources include a remote email system that can be searched in connection with a group-based communication system search. In an embodiment, whether the remote email system is searched can be toggled on or off by a client using a command such as, for example a "slash" command such as "/searchemail on" or "/searchemail off" as shown in element 710.

In various embodiments, interactive messages are responded to as follows. When receiving messages generated by interactive components, a developer may choose to respond to the message directly (via HTTP response) or make a separate HTTP request with relevant data.

Analogously, the link protocol provides a way for a developer to respond to a message delivered over the web socket interface while also supporting asynchronous responses for the components that use them.

UI and commands may cause messages to be generated. Slash commands allow users to invoke an application by typing a string into the message composer box. When a slash command is invoked the command causes a payload of data to be sent from the group-based communication system to the associated app (or application, the terms "app" and "application" being used herein interchangeably). The app can then respond in whatever way it wants using the context provided by that payload. FIG. 7 provides exemplary slash commands. Slash commands and user interface components (such as those provided by the Block Kit User Interface framework) may trigger an application to make a link protocol request. In various embodiments, interactivity operations are carried out using user interface components and may provide application interaction.

A UI framework, such as Block Kit, provides a way to construct user interface components, like buttons, within a web platform. When a user interface component is activated by the user in the group-based communication system, events are sent to the developer and their replies update the UI.

In various embodiments, application interaction from a home page or tab of an application in the group-based communication system is a private, one-to-one space shared by a user and an application. Interactions in the home page include UI components. Within every application home page, users find multiple tabs: about, messages, and the home tab. The home tab is a dynamic and persistent visual interface allowing users to interact privately with an application. The application can greet users and display customized content. When the user interacts with the content and the user interface controls associated with the application, corresponding information is provided in a link protocol payload, which is transmitted to the web platform by way of the link protocol connection.

A modal submission provides focused spaces within the group-based communication system client user interface for requesting and collecting data from users or temporarily displaying dynamic and interactive information to the user by way of the client user interface. Content associated with a modal submission is provided in a link protocol payload so that an interactive message is provided to the user of the group-based communication system based on a present state of the application.

A dynamic menu is an input method for which the menu options are updated in real-time as a response to the group-based communication system user's actions. For example, a dynamic menu provides a drop-down list of actions that may be selected by the user, and this list of actions updates depending on a previous action taken by the user. Content associated with the dynamic menu is provided by the application as a link protocol payload so that the group-based communication system can update the client user interface accordingly.

A response from the application in response to received message interactions generated from interaction with UI components, app home interactivity, interactive modals, and dynamic menus in the group-based communication system is awaited before the group-based communication system user interface is updated.

Figure 2:
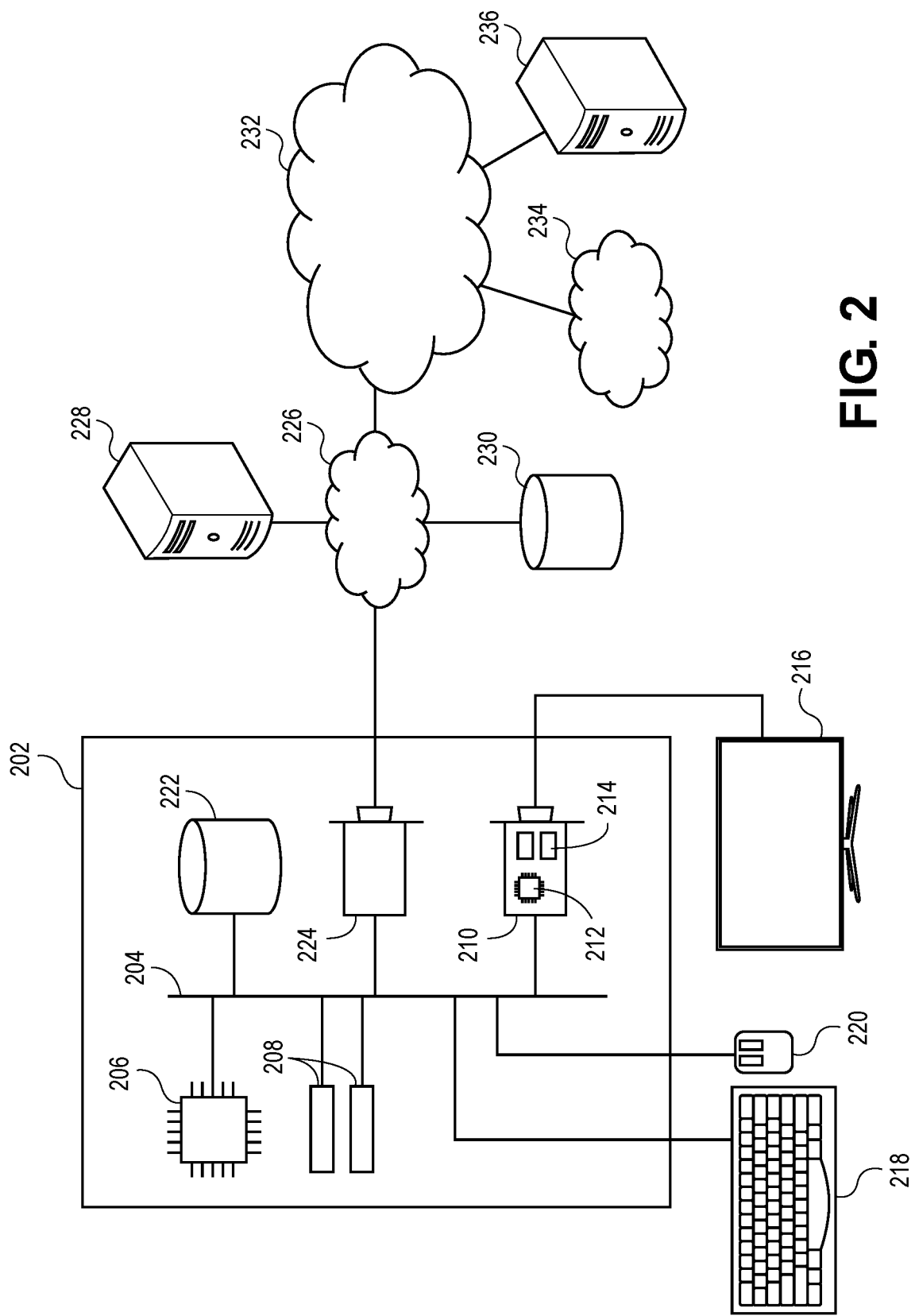
FIG. 2 depicts an exemplary hardware platform for certain embodiments of the invention.

FIG. 2 depicts an exemplary hardware platform for certain embodiments of the invention. Computer 202 can be a desktop computer, a laptop computer, a server computer, a mobile device such as a smartphone or tablet, or any other form factor of general- or special-purpose computing device. Depicted with computer 202 are several components, for illustrative purposes. In some embodiments, certain components may be arranged differently or absent. Additional components may also be present. Included in computer 202 is system bus 204, whereby other components of computer 202 can communicate with each other. In certain embodiments, there may be multiple busses or components may communicate with each other directly. Connected to system bus 204 is central processing unit (CPU) 206. Also attached to system bus 204 are one or more random-access memory (RAM) modules 208. Also attached to system bus 204 is graphics card 210. In some embodiments, graphics card 204 may not be a physically separate card, but rather may be integrated into the motherboard or the CPU 206. In some embodiments, graphics card 210 has a separate graphics-processing unit (GPU) 212, which can be used for graphics processing or for general purpose computing (GPGPU). Also on graphics card 210 is GPU memory 214. Connected (directly or indirectly) to graphics card 210 is display 216 for user interaction. In some embodiments no display is present, while in others it is integrated into computer 202. Similarly, peripherals such as keyboard 218 and mouse 220 are connected to system bus 204. Like display 216, these peripherals may be integrated into computer 202 or absent. Also connected to system bus 204 is local storage 222, which may be any form of computer-readable media, and may be internally installed in computer 202 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 224 is also attached to system bus 204 and allows computer 202 to communicate over a network such as network 226. NIC 224 can be any form of network interface known in the art, such as Ethernet, ATM, fiber, Bluetooth, or Wi-Fi (i.e., the IEEE 802.11 family of standards). NIC 224 connects computer 202 to local network 226, which may also include one or more other computers, such as computer 228, and network storage, such as data store 230. Generally, a data store such as data store 230 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 228, accessible on a local network such as local network 226, or remotely accessible over Internet 232. Local network 226 is in turn connected to Internet 232, which connects many networks such as local network 226, remote network 234 or directly attached computers such as computer 236. In some embodiments, computer 202 can itself be directly connected to Internet 232.

A person of ordinary skill will appreciate that this general description of a computing device can be applied to the various components discussed below with respect to (for example) FIG. 2. Thus, user device 256 might be a smartphone connected to the Internet via a cellular data plan, while group-based communication system server 258 might be a server computer connected to the Internet via Ethernet and with a locally attached magnetic hard driver storing a SQL database. Similarly, identity provider server 264 might be a virtual machine instance running in the cloud accessing a network-connected identity provider data store in the form of a distributed Bigtable instance.

Figure 3:
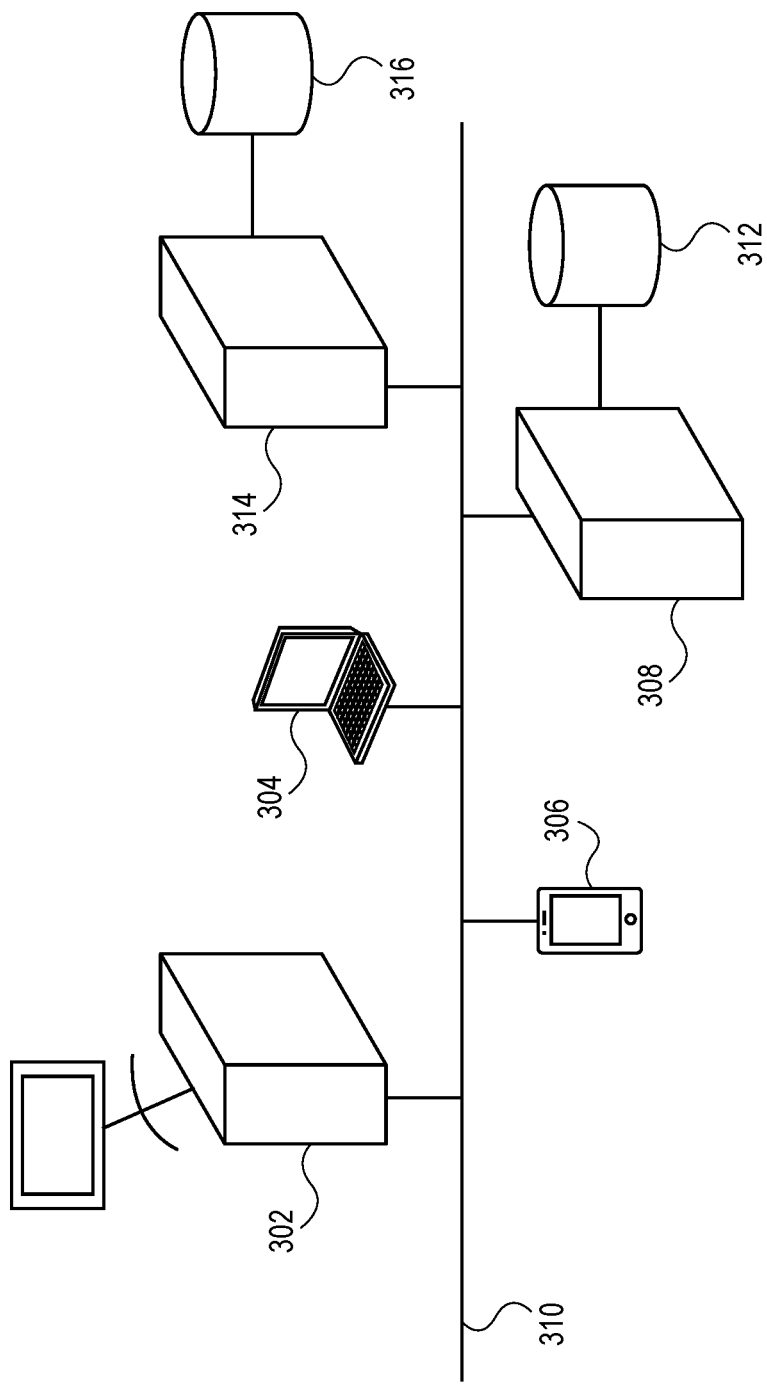
FIG. 3 depicts a system figure illustrating the elements of a system for carrying out embodiments of the invention.

FIG. 3 depicts a system figure illustrating the elements of a system for carrying out embodiments of the invention. System 300 includes any number of client devices such as client device 352, client device 354, and client device 356. As depicted in FIG. 3, client devices may be any form of computing device discussed above with respect to FIG. 2. In particular, a user may access the group-based communication system using a desktop, a laptop, or a mobile device. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 352). In some examples, the group-based communication system is a channel-based messaging platform.

The group-based communication system is hosted by group-based communication system server 358. Channel-based communication system server 358 may be a dedicated server, a shared server, a virtual machine instance in a cloud computing environment, or any other form of computing device discussed above with respect to FIG. 2. Although a single group-based communication system server 358 is depicted, embodiments with multiple such group-based communication system servers are also contemplated so as to provide scale, redundancy and/or isolation between different instances of the group-based communication system. For example, the software development company discussed above may not wish to have its channel-based communications system hosted on the same server as a competitor's group-based communication system for security reasons. Server 358 is communicatively coupled to client devices 352, 354, and 356 via network 360. Network 360 may be a local area network (LAN), wide-area network (WAN), virtual private network (VPN) or the Internet. Broadly speaking, any type of network for providing communication between the various components of system 350 is contemplated. Channel-based communication system server 358 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Channel data store 362 is communicatively connected to group-based communication system server 358. As depicted, channel data store 362 is directed connected to group-based communication system server 358; however, any form of communicative connection (for example, network-attached storage (NAS), a network file system (NFS), or cloud-based storage) can be employed. Broadly speaking, channel data store 362 stores the all of the information used by group-based communication system server 358. For example, channel data store 362 may store all of the messages with their associated channels, documents and images uploaded to particular channels, channel membership information, and/or user information. In particular, channel data store 362 may store the lists of whitelisted groups for any channels using whitelisted-groups access control and, for embodiments where different user namespaces are used for the group-based communication system and the identity provider, user identifier mappings between the two namespaces. As previously discussed, multiple group-based communication system servers may be present in system 350. In such embodiments, each group-based communication system server may have its own copy of channel data store 362. Alternatively, multiple group-based communication system servers may share a single network-attached channel data store. Alternatively or in addition, in any of these embodiments, data may be sharded across multiple channel data stores.

Also communicatively coupled to group-based communication system server 358 is identity provider server 364. As depicted, clients 352, 354, and 356, group-based communication system server 358 and identity provider server 364 are all attached to the same network. However, embodiments where this is not the case are also contemplated. For example, client 352 and group-based communication system server 358 may be attached to the same LAN, while client 354 is attached via a VPN and clients 356 and identity provider server 364 are connected via the Internet. Broadly, any combination of forms of communicative coupling is contemplated. In some embodiments, identity provider server 364 may be the same physical server as group-based communication system server 358.

Communicatively coupled to identity provider server 364 is identity provider data store 366. Identity provider data store 366 stores identity data used for whitelisted-groups access control. Identity provider data store 366 may additionally store other data used in providing identity services, including user identity data, user authentication data, user group data, user permission data and user contact data. As with channel data store 362, identity provider data store 366 may be directly connected to identity provider server 364 or may be connected via any form of network and may be replicated and/or sharded across the network for performance and/or reliability.

Figure 4:
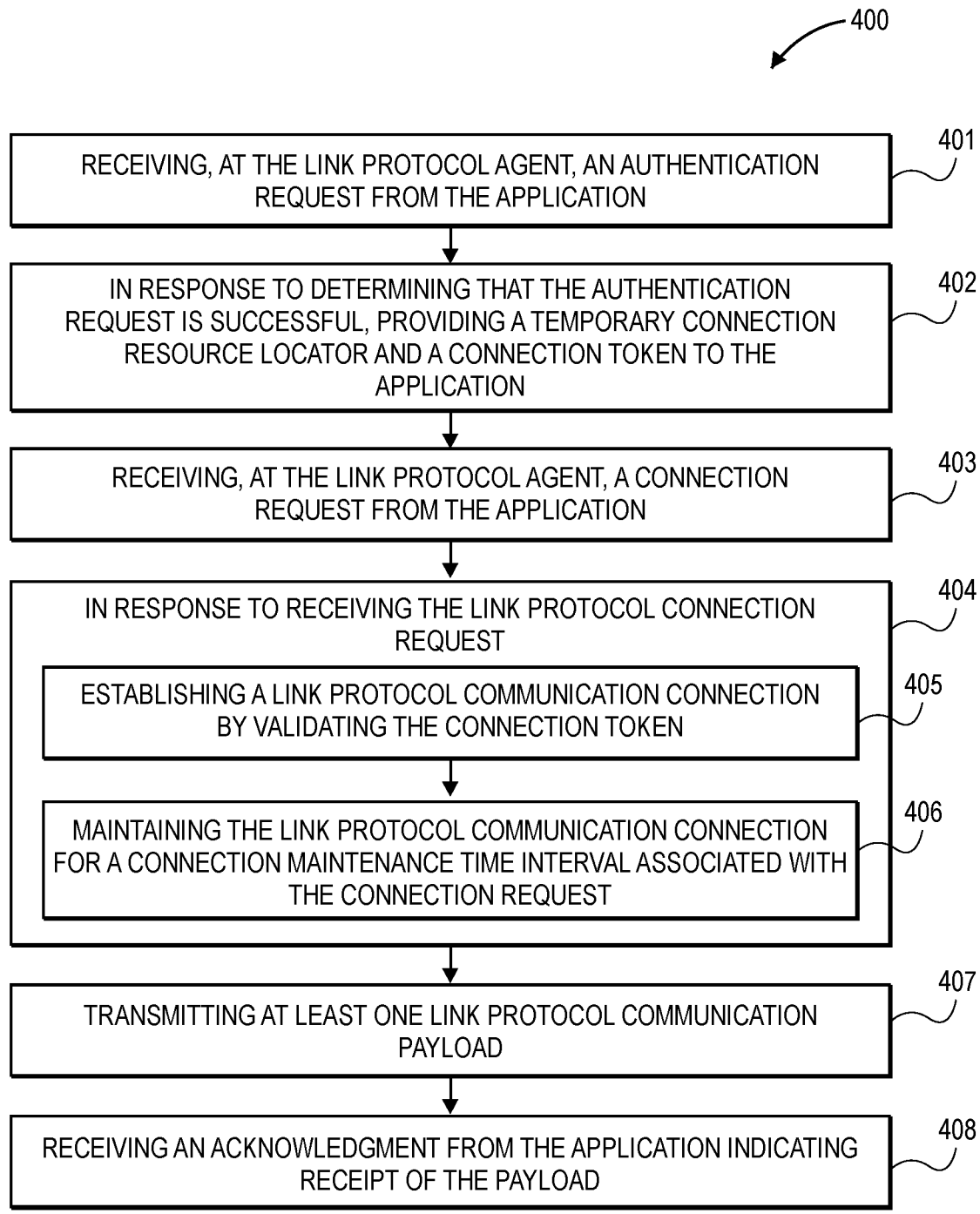
FIG. 4 is a flow diagram of an example process for performing cross-firewall communications in accordance with one embodiment of the present disclosure.

FIG. 4 is a flow diagram of an example process 400 for performing inter-application communication consistent with the present teachings. Through the various operations of 400, a computer system (e.g., the host computing device 101 of FIG. 1) may be able to enable inter-application communications between a particular computing device (e.g., a non-firewalled computing device, such as the host computing device 101 of FIG. 1) and a firewalled computing device (e.g., the firewalled computing device 102 of FIG. 1). The various operations of the process 400 will herein be described with reference to link protocol agent 113 of FIG. 1, although a person of ordinary skill in the art will recognize that the various operations may be performed by any system of one or more computers, e.g., a system including and/or configured to perform various operations of the link protocol agent 113 of the host computing device 101 of FIG. 1.

The process 400 begins at block 401 by receiving, at the link protocol agent, an authentication request from the application. Further, at decision block 402, in response to determining that the authentication request is successful, the link protocol agent 113 provides a temporary connection resource locator and a connection token to the application. In various embodiments, the temporary resource locator is a web socket URL such as wss://example.com/endpoint. In various embodiments, the token is an OAuth2 token obtained by performing an OAuth2 handshake. If the authentication request is not successful, the process begins again at block 401. Next, at block 404 a connection request is received from the application at the link protocol agent 113.

At block 405, in response to receiving the link protocol connection request, a link protocol communication connection is established by validating the connection token and the link protocol communication connection is maintained for a connection maintenance time interval associated with the connection request. Next at block 406, at least one link protocol communication payload is transmitted. Finally, at block 407 an acknowledgement is received from the application indicating receipt of the payload.

When the link protocol agent 113 receives a link authentication request from an application computing device that may or may not be separated from the link protocol agent 113 by a firewall. In some embodiments, the link protocol agent 113 receives a data structure represents a request by the application computing device to establish a link protocol communication connection with another computing device. In some embodiments, the link protocol request received from a firewalled computing device includes a request by a resource associated with the application computing device to "subscribe" to one or more services offered by a link protocol agent associated with a group-based communication system.

In some embodiments, the link protocol agent 113 generates a link protocol communication object that is configured to: (i) comply with one or more incoming firewall security rules associated with a firewall security component of the application computing device (e.g., such that the link protocol communication object will "pass through" the firewall security component to reach an intended resource); and/or (ii) establish a link protocol communication connection between a particular computing device and the application computing device (e.g., such that the link protocol communication object enables the particular computing device and the application computing device to perform cross-firewall communications). In some embodiments, establishing the link protocol communication comprises establishing a cross-firewall communication connection between the first computing device and the application computing device. In some embodiments, the link protocol agent 113 creates a link protocol communication connection by instantiating and/or utilizing one or more web-socket objects.

In various embodiments, the link protocol agent 113 may be further configured to maintain the link protocol communication connection for a connection maintenance time interval. In some embodiments, the connection maintenance interval is characterized by a desired connection termination timestamp that is used to maintain as established the link protocol communication connection for the first period of time and includes transmitting at least one communication object using the link communication connection to the application computing device prior to or at the desired connection termination timestamp. In some embodiments, the connection maintenance interval is a desired time interval for maintaining a link protocol communication connection, i.e., for ensuring that the link protocol communication connection is configured to enable successful transmission of communication objects from a particular computing device to an application computing device. In some embodiments, the connection maintenance time interval for a link protocol communication connection is an indefinite time period, e.g., the link protocol communication connection is configured to permit successful transmission of communication objects from a particular computing device to an application computing device permanently and/or until the link protocol communication connection is disabled.

In some embodiments, the desired connection termination timestamp is a dynamically-adjusted time that can be extended by a connection extension period if there is a successful transmission of an incoming communication object from the link protocol agent 113 to the application computing device. In at least some of those embodiments, maintaining the link protocol communication connection for a connection maintenance time period includes successfully transmitting a communication object to the application computing device before the end of each connection extension period to further extend the link protocol communication connection.

For example, if the desired connection maintenance interval for a link protocol communication connection is 10 minutes, and further if each link protocol communication connection expires after 2 minutes without successful transmission of a connection-extending communication object, maintaining the link protocol communication connection for the desired 10 minutes may include sending connection-extending communication objects at the 2-minute mark from connection initiation timestamp, the 4-minute mark from connection initiation timestamp, and the 8-minute mark from connection initiation timestamp. As another example, if the desired connection maintenance interval for a link protocol communication connection is an indefinite mark, and further if each link protocol communication connection expires after 2 minutes without successful transmission of a connection-extending communication object, maintaining the link protocol communication connection for the desired indefinite period may include sending connection-extending communication objects at the 2-minute mark from connection initiation timestamp, the 4-minute mark from connection initiation timestamp, the 8-minute mark from connection initiation timestamp, the 10-minute mark from the connection initiation timestamp, and so on.

In some embodiments, the one or more incoming firewall rules for the application computing device include at least one incoming firewall rule configured to establish a responsive pass-through privilege. In some of the embodiments where the one or more incoming firewall rules for the application computing device include at least one incoming firewall rule configured to establish a responsive pass-through privilege, maintaining a link protocol communication connection in accordance with various operations of block 402 may be performed in accordance with the various operations of process 600 depicted in FIG. 6.

FIGS. 5A-5C provide example flow diagrams of example processes 500, 540, and 580 for establishing, via the operations performed by a link protocol agent 502, various link protocol communication connections between a host resource 501 and a firewalled resource 503, where the firewalled resource 503 is protected by a network firewall 510. As depicted in FIG. 5A, by performing the process 500, the link protocol agent 502 establishes the link protocol communication connection 511, a "pass-through" communication connection whose associated data transmissions are processed by the network firewall 510 but are deemed authorized to be transmitted to the firewalled resource 503. For example, the link protocol agent 502 may first receive a link protocol request from the firewalled resource and determine that the incoming firewall security rules of the network firewall 510 permit responsive pass-through privilege, which is a firewall rule that permits network traffic between the respective computing resources. In response to determining that the firewall incoming rules of the network firewall 510 permit responsive pass-through privilege, the link protocol agent 502 may transmit a link protocol communication object in response to the link protocol request that establishes the link protocol communication connection 511.

As depicted in FIG. 5B, by performing the process 540, the link protocol agent 502 establishes the link protocol communication connection 512, which is a bipartite "pass-under" communication connection whose associated data transmissions are not processed by the network firewall 510 but are instead transmitted between two computing entities (e.g., the host-side cross-firewall agent 541 and the firewalled-side cross-firewall agent 542). In some embodiments, the network firewall 510 is configured to always authorize transmissions by the firewalled-side cross-firewall agent 542 and to the firewalled resource 503 to be transmitted to the firewalled resource 503. In some embodiments, the network firewall 510 is configured to always authorize transmissions by the firewalled resource 503 and to the firewalled-side cross-firewall agent 542 to be transmitted to firewalled-side cross-firewall agent 542. In some embodiments, the network firewall 510 is configured to exempt transmissions by the firewalled-side cross-firewall agent 542 and to the firewalled resource 503 from any processing beyond determining the source of those transmissions. In some embodiments, the network firewall 510 is configured to exempt transmissions by firewalled resource 503 and to the firewalled-side cross-firewall agent 542 from any processing beyond determining the source of those transmissions.

As depicted in FIG. 5C, by performing the process 580, the link protocol agent 502 establishes the link protocol communication connection 513, which is a centralized "pass-under" communication connection whose associated data transmissions are not processed by the network firewall 510 but are instead transmitted by using an inter-resource communication server 581 (e.g., an online inter-resource communication server). In some embodiments, the network firewall 510 is configured to always authorize transmissions by the inter-resource communication server 581 and to the firewalled resource 503 to be transmitted to the firewalled resource 503. In some embodiments, the network firewall 510 is configured to always authorize transmissions by the firewalled resource 503 and to the inter-resource communication server 581 to be transmitted to firewalled-side cross-firewall agent 542. In some embodiments, the network firewall 510 is configured to exempt transmissions by the inter-resource communication server 581 and to the firewalled resource 503 from any processing beyond determining the source of those transmissions. In some embodiments, the network firewall 510 is configured to exempt transmissions by firewalled resource 503 and to the inter-resource communication server 581 from any processing beyond determining the source of those transmissions.

Returning to FIG. 4, the link protocol agent 113 may be further configured to maintain the link protocol communication connection for a connection maintenance time interval. In some embodiments, the connection maintenance interval is characterized by a desired connection termination timestamp that is used to maintain as established the link protocol communication connection for the first period of time and includes transmitting at least one communication object using the link communication connection to the application computing device prior to or at the desired connection termination timestamp. In some embodiments, the connection maintenance interval is a desired time interval for maintaining a link protocol communication connection, i.e., for ensuring that the link protocol communication connection is configured to enable successful transmission of communication objects from a particular computing device to a application computing device. In some embodiments, the connection maintenance time interval for a link protocol communication connection is an indefinite time period, e.g., the link protocol communication connection is configured to permit successful transmission of communication objects from a particular computing device to a application computing device permanently and/or until the link protocol communication connection is disabled.

In some embodiments, the desired connection termination timestamp is a dynamically-adjusted time that can be extended by a connection extension period if there is a successful transmission of an incoming communication object from the link protocol agent 113 to the application computing device. In at least some of those embodiments, maintaining the link protocol communication connection for a connection maintenance time period includes successfully transmitting a communication object to the application computing device before the end of each connection extension period to further extend the link protocol communication connection.

For example, if the desired connection maintenance interval for a link protocol communication connection is 10 minutes, and further if each link protocol communication connection expires after 2 minutes without successful transmission of a connection-extending communication object, maintaining the link protocol communication connection for the desired 10 minutes may include sending connection-extending communication objects at the 2-minute mark from connection initiation timestamp, the 4-minute mark from connection initiation timestamp, and the 8-minute mark from connection initiation timestamp. As another example, if the desired connection maintenance interval for a link protocol communication connection is an indefinite mark, and further if each link protocol communication connection expires after 2 minutes without successful transmission of a connection-extending communication object, maintaining the link protocol communication connection for the desired indefinite period may include sending connection-extending communication objects at the 2-minute mark from connection initiation timestamp, the 4-minute mark from connection initiation timestamp, the 8-minute mark from connection initiation timestamp, the 10-minute mark from the connection initiation timestamp, and so on.

In some embodiments, the one or more incoming firewall rules for the application computing device include at least one incoming firewall configured rule configured to establish a responsive pass-through privilege. In some of the embodiments where the one or more incoming firewall rules for the application computing device include at least one incoming firewall configured rule configured to establish a responsive pass-through privilege, maintaining a link protocol communication connection in accordance with various operations of block 402 may be performed in accordance with the various operations of process 600 depicted in FIG. 6. As depicted in FIG. 6, the process 600 begins at block 601 when the link protocol agent 113 determines a privilege termination timestamp associated with a link protocol communication connection. In some embodiments, the link protocol agent 113 identifies the link protocol communication connection, determines that the link protocol communication connection corresponds to a responsive pass-through privilege, and determines the privilege termination timestamp for the responsive pass-through privilege. In some embodiments, the link protocol agent 113 further determines that the privilege termination timestamp is determined dynamically.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the disclosure has been provided with reference to the embodiments illustrated in the attached drawing figures, it is noted that equivalents may be employed and substitutions made herein without departing from the scope recited in the claims.

Having thus described various embodiments of the disclosure, what is claimed as new and desired to be protected by Letters Patent includes the following:

The invention claimed is:

1. One or more non-transitory computer-readable media storing computer-executable instructions that, when executed by a processor, perform a method for facilitating secure inter-application communications between a web platform and an application using a link protocol agent associated with the web platform, the method comprising:
receiving, at the link protocol agent, an authentication request from the application;
in response to determining that the authentication request is successful, providing, by the link protocol agent, a temporary connection resource locator and a connection token to the application,
wherein the temporary connection resource locator is a single-use web socket uniform resource locator that, once called for a connection, is invalidated for future connection,
wherein the single-use web socket uniform resource locator expires after a predetermined period of time when not called for the connection;
receiving, at the link protocol agent, a connection request from the application;
responsive to receiving the connection request:
establishing a link protocol communication connection by validating the connection token; and
maintaining the link protocol communication connection for a connection maintenance time interval associated with the connection request;
transmitting at least one first link protocol communication payload;
receiving an acknowledgement from the application indicating receipt of the at least one first link protocol communication payload and comprising an indication of the at least one first link protocol communication payload;
transmitting at least one second link protocol communication payload if the acknowledgement is not received within an acknowledgment time period;
tracking, by the link protocol agent, an acknowledgment rate from the application and disabling the link protocol communication connection if the acknowledgment rate falls below a threshold; and
storing each successive link protocol communication payload.

2. The computer-readable media of claim 1, wherein the authentication request comprises an authentication handshake.

3. The computer-readable media of claim 2, wherein maintaining the link protocol communication connection further comprises:
sending a warning message, prior to a disconnection, that the link protocol communication connection will be disconnected.

4. The computer-readable media of claim 3, wherein receiving the authentication request comprises identifying a user request for using a firewalled resource associated with a firewalled computing device, wherein the authentication request is generated by interacting, by the application, with a first resource associated with the application.

5. The computer-readable media of claim 1, wherein the authentication request is a web application programming interface call to an authentication endpoint associated with the web platform.

6. The computer-readable media of claim 5, wherein the authentication request is made through at least one network firewall.

7. The computer-readable media of claim 1, wherein the method further comprises:
sending a new single-use web socket uniform resource locator upon expiration of the single-use web socket uniform resource locator and receipt of a new authentication request.

8. A method for facilitating secure inter-application communications between a web platform and an application using a link protocol agent associated with the web platform, the method comprising:
receiving, at the link protocol agent, an authentication request from the application;
in response to determining that the authentication request is successful, providing, by the link protocol agent, a temporary connection resource locator and a connection token to the application,
wherein the temporary connection resource locator is a single-use web socket uniform resource locator that, once called for a connection, is invalidated for future connection, wherein the single-use web socket uniform resource locator expires after a period of time when not called for the connection;

receiving, at the link protocol agent, a connection request from the application;

responsive to receiving the connection request:
  establishing a link protocol communication connection by validating the connection token; and
  maintaining the link protocol communication connection for a connection maintenance time interval associated with the connection request;

transmitting at least one first link protocol communication payload;

receiving an acknowledgement from the application indicating receipt of the at least one first link protocol communication payload and comprising an indication of the at least one first link protocol communication payload;

transmitting at least one second link protocol communication payload if the acknowledgement is not received within an acknowledgment time period;

tracking, by the link protocol agent, an acknowledgment rate from the application and disabling the link protocol communication connection if the acknowledgment rate falls below a threshold; and storing each successive link protocol communication payload.

9. The method of claim 8, wherein the authentication request comprises an authentication handshake.

10. The method of claim 9, wherein maintaining the link protocol communication connection further comprises:
  sending a warning message, prior to a disconnection, that the link protocol communication connection will be disconnected.

11. The method of claim 10, wherein receiving the authentication request comprises identifying a user request for using a firewalled resource associated with a firewalled computing device, wherein the authentication request is generated by interacting, by the application, with a first resource associated with the application.

12. The method of claim 8, wherein the authentication request is a web application programming interface call to an authentication endpoint associated with the web platform.

13. The method of claim 12, wherein the authentication request is made through at least one network firewall.

14. The method of claim 8, further comprising sending a new single-use web socket uniform resource locator upon expiration of the single-use web socket uniform resource locator and receipt of a new authentication request.

15. A system comprising at least one processor and one or more non-transitory computer-readable media storing computer-executable instructions that, when executed by a processor, perform a method for facilitating secure inter-application communications between a web platform and an application using a link protocol agent associated with the web platform, the method comprising:

receiving, at the link protocol agent, an authentication request from the application;

in response to determining that the authentication request is successful, providing, by the link protocol agent, a temporary connection resource locator and a connection token to the application, wherein the temporary connection resource locator is a single-use web socket uniform resource locator that, once called for a connection, is invalidated for future connection, wherein the single-use web socket uniform resource locator expires after a period of time when not called for the connection;

receiving, at the link protocol agent, a connection request from the application;

responsive to receiving the connection request:
  establishing a link protocol communication connection by validating the connection token; and
  maintaining the link protocol communication connection for a connection maintenance time interval associated with the connection request;

transmitting at least one first link protocol communication payload;

receiving an acknowledgement from the application indicating receipt of the at least one first link protocol communication payload and comprising an indication of the at least one first link protocol communication payload;

transmitting at least one second link protocol communication payload if the acknowledgement is not received within an acknowledgment time period;

tracking, by the link protocol agent, an acknowledgment rate from the application and disabling the link protocol communication connection if the acknowledgment rate falls below a threshold; and storing each successive link protocol communication payload.

16. The system of claim 15, wherein the authentication request comprises an authentication handshake.

17. The system of claim 16, wherein maintaining the link protocol communication connection further comprises:
  sending a warning message, prior to a disconnection, that the link protocol communication connection will be disconnected.

18. The system of claim 17, wherein receiving the authentication request comprises identifying a user request for using a firewalled resource associated with a firewalled computing device, wherein the authentication request is generated by interacting, by the application, with a first resource associated with the application.

19. The system of claim 15, wherein the authentication request is a web application programming interface call to an authentication endpoint associated with the web platform.

20. The system of claim 19, wherein the authentication request is made through at least one network firewall.

* * * * *